(12) United States Patent
Matsudaira (10) Patent No.: US 10,484,166 B2
(45) Date of Patent: Nov. 19, 2019

(54) RECEIVER

(71) Applicant: DENSO CORPORATION, Kariya, Aichi-pref. (JP)

(72) Inventor: Nobuaki Matsudaira, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 15/739,452

(22) PCT Filed: Sep. 5, 2016

(86) PCT No.: PCT/JP2016/075926
§ 371 (c)(1),
(2) Date: Dec. 22, 2017

(87) PCT Pub. No.: WO2017/056855
PCT Pub. Date: Apr. 6, 2017

(65) Prior Publication Data
US 2018/0191488 A1    Jul. 5, 2018

(30) Foreign Application Priority Data

Sep. 28, 2015  (JP) ................. 2015-189662

(51) Int. Cl.
*H04L 7/033* (2006.01)
*H04L 29/06* (2006.01)
(Continued)

(52) U.S. Cl.
CPC ......... *H04L 7/033* (2013.01); *H03L 7/00* (2013.01); *H03L 7/06* (2013.01); *H04B 1/10* (2013.01);
(Continued)

(58) Field of Classification Search
CPC ..... H04L 12/40013; H04L 2012/40215; H04L 12/40169; H04L 12/40006; H04L 12/66;
(Continued)

(56) References Cited

U.S. PATENT DOCUMENTS

| 7,672,368 | B2 | 3/2010 | Agazzi |
| 2007/0127600 | A1* | 6/2007 | Sato ............... H04L 7/0054 375/327 |
| 2008/0068236 | A1* | 3/2008 | Sheba ............. G04F 10/005 341/118 |

FOREIGN PATENT DOCUMENTS

| JP | S64-042949 A | 2/1989 |
| JP | H04-274634 A | 9/1992 |
| JP | 2004-235858 A | 8/2004 |

OTHER PUBLICATIONS

"Timing Recovery in Digital Synchronous Data Receivers", by Mueller and Müller, IEEE Transactions on Communications, vol. COM-24, No. 5, May 1976.

* cited by examiner

*Primary Examiner* — David C Payne
*Assistant Examiner* — Sarah Hassan
(74) *Attorney, Agent, or Firm* — Posz Law Group, PLC (57) ABSTRACT

A receiver includes: an A/D converter that performs an analog digital conversion of an input signal; an equalizer that equalizes an output from the A/D converter, eliminates inter code interference and obtains a data output; a timing recovery part that generates a recovery clock from the data output of the equalizer; a detector that detects the timing when an input signal varies from a no-signal state and has reached a predetermined threshold; and an initial phase setting part that sets as the initial phase of the recovery clock by the timing recovery part, a timing when the predetermined time has elapsed after the timing detected by the detector.

3 Claims, 10 Drawing Sheets

(51) Int. Cl.
*H04B 1/10* (2006.01)
*H04B 3/06* (2006.01)
*H04L 7/10* (2006.01)
*H03L 7/00* (2006.01)
*H04L 25/03* (2006.01)
*H03L 7/06* (2006.01)
*H04L 7/00* (2006.01)
*H04L 12/40* (2006.01)

(52) U.S. Cl.
CPC ............. *H04B 3/06* (2013.01); *H04L 7/0004* (2013.01); *H04L 7/10* (2013.01); *H04L 12/40* (2013.01); *H04L 12/40013* (2013.01); *H04L 25/03* (2013.01); *H04L 25/03012* (2013.01); *H04L 25/03146* (2013.01); *H04L 63/12* (2013.01); *H03L 2207/50* (2013.01); *H04L 7/0062* (2013.01)

(58) Field of Classification Search
CPC ..... H04L 63/08; H04L 63/0876; H04L 63/12; H04L 63/1433
USPC .......................................... 375/138; 370/347
See application file for complete search history.

FD BASE FRAME FORMAT

| | | ARBITRATION PHASE<br>(STANDARD BIT RATE) | | | | | DATA PHASE<br>(OPTIONAL HIGH BIT RATE) | | |
|---|---|---|---|---|---|---|---|---|---|
| S O F | BASE ID | R R S | I D E | F D F | r e s | B R S | E S I | 4 BIT DLC | |

FIG. 10B

FD EXTENDED FRAME FORMAT

| | | ARBITRATION PHASE<br>(STANDARD BIT RATE) | | | | | | | DATA PHASE<br>(OPTIONAL HIGH BIT RATE) | |
|---|---|---|---|---|---|---|---|---|---|---|
| S O F | BASE ID | S R R | I D E | ID EXTENSION | R R S | F D F | r e s | B R S | E S I | 4 BIT DLC |

FIG. 11

RECEIVER

CROSS REFERENCE TO RELATED APPLICATIONS

This present application is a U.S. national stage of International Patent Application No. PCT/JP2016/075926 filed on Sep. 5, 2016 and is based on Japanese Patent Application No. 2015-189662 filed on Sep. 28, 2015, the disclosures of which are incorporated herein by reference.

TECHNICAL FIELD

The present disclosure relates to a receiver including a clock recovery restoring a clock.

BACKGROUND ART

Clock recovery technology is generally provided as a technology to recover a clock from a superimposed signal when the clock is superimposed on data. For example, according to high speed serial communication technology such as USB (Universal Serial Bus), a reception data is oversampled by using operation clock of frequency which is twice of data rate, so that clocks are restored.

On the other hand, for example, as shown in Gigabit Ethernet (a registered trademark) from 1000 BASE-T, when a receiver is configured by using a transceiver of a digital signal processing type including ADC (Analog to Digital Convertor), a circuit is configured so that an operation clock frequency corresponds to a data rate. That is, in a case of 1000 BASE-T, a communication process is implemented by 125 Msps, and the reception circuit operates by the clock signals of 125 MHz and an oversampling process is not performed generally. When a speed of the operational frequency of the ADC increases, a circuit configuration becomes complicated and a circuit area increases. To avoid this difficulty, the oversampling is not performed generally.

As a method estimating an optimum sampling position while performing the sampling processing by a frequency identical with the reception data, a technology called as Mueller-Muller Timing Recovery is known. Mueller-Muller Timing Recovery technology is the technology that estimates an optimum sampling timing corresponding to an interference wave caused by an inter-code interference. The technology adapts an algorithm that estimates the sampling position so as to satisfy a state that, as a sampling interval is made consonant with a period of the data rate, a main signal equals to amplitude of the interference wave that preceding or succeeding temporally.

On the other hand, the receiver for the digital signal processor includes an equalizer that is positioned a previous stage of a timing recovery part restoring the recovery clocks, and the equalizer eliminates the inter-code interference.

PRIOR ART LITERATURE

Patent Literature

Patent Literature 1: U.S. Pat. No. 7,672,368 B2

SUMMARY OF INVENTION

When the timing recovery part generates the recovery clock such as a time at a start that the input signal varies from a no-signal state, another technology may be used (for example, refer to Patent Literature 1). In order to easily make convergence, the timing recovery part described in Patent Literature 1 is configured to generate the recovery clock by an open loop mode separated from an equalizer. In this case, a phase of the recovery clock is linearly varied at a greatly slow speed. At this time, the equalizer performs a convergence operation, and the timing recovery part is performed by the open loop mode. Therefore, the result of the convergence by the equalizer is not affected by the timing recovery part.

After that, the phase of the recovery clock becomes an optimal value to the input signal and also, the equalizer converges. After the equalizer converges, the timing recovery part operates in the closed loop mode and refines the convergence operation. By using the technology, after the timing recovery part and the equalizer move to a state close to an ideal state, the convergence operation starts, so that a difficulty of interference at the start can be avoided.

The process is set to vary the phase of the recovery clock linearly at the greatly slow speed in the open loop mode. Subsequently, the process is set to back to the close loop mode and refine the convergence operation. The equalizer and the timing recovery part are both configured in a path dealing with interface wave caused by the inter-code interference. Therefore, the circuit is set so that the equalizer and the timing recovery part intrinsically affect each other. At particularly the start, when the process is implemented, the convergence process may sometimes take long time.

Since the phase of the input signal is unknown at the start, the error may not decrease to an intended value until the phase achieves a final phase when the phase of the recovery clock is linearly increased in some cases. In addition, in each step, it takes long time to wait for the convergence of the error of the equalizer. Depending on an application that is used, an indeterminate waiting time like that may be not acceptable.

For example, in a case of adapting to an on-hoard apparatus, when the control signal is transmitted and received, it is necessary to surely complete the communication process within a predetermined time and it is impossible to adopt the technology requiring the indeterminate waiting time.

It is an object of the present disclosure to provide a receiver that enable to converging at a high speed by using an equalizer and a timing recovery part also at a start that a signal varies from a no-signal state, without making an operational frequency of the A/D convertor become high-speed.

According to one aspect of the present disclosure, a receiver includes: an A/D converter that performs an analog digital conversion to an input signal; an equalizer that equalizes an output of the A/D converter, eliminates an inter-code interference, and obtains a data output; a timing recovery part that generates a recovery clock from the data output of the equalizer; a detector that detects a timing when the input signal varies from a no-signal state and has reached a predetermined threshold; and an initial phase setting part that sets as an initial phase of the recovery clock by the timing recovery part, a timing when a predetermined time has elapsed after the timing detected by the detector.

For example, at the start, the input signal is in the no-signal state. The detector detects the timing when the input signal varies from the no-signal state and reaches a predetermined threshold. An initial phase setting part sets a timing as the initial phase of the recovery clock by the timing recovery part, the timing when a predetermined time elapses after the timing the detector detects the timing. The A/D converter performs the A/D conversion of the input signal.

With this, at the start that the signal changes from the no-signal state, it may be possible to converge at the high-speed by using the equalizer and the timing recovery part without increasing the operational frequency of the A/D converter. When the input signal changes after the no-signal state continues except for the start, it may be possible to obtain a similar effect also.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Hereinafter, embodiments of the present disclosure will be explained with reference to the drawings regarding several receivers. In each of the embodiments, a component including identical or similar function each other will be omitted by attaching identical numerals as needed. A characteristic part of each embodiment will be mainly explained.

First Embodiment

Figure 1:
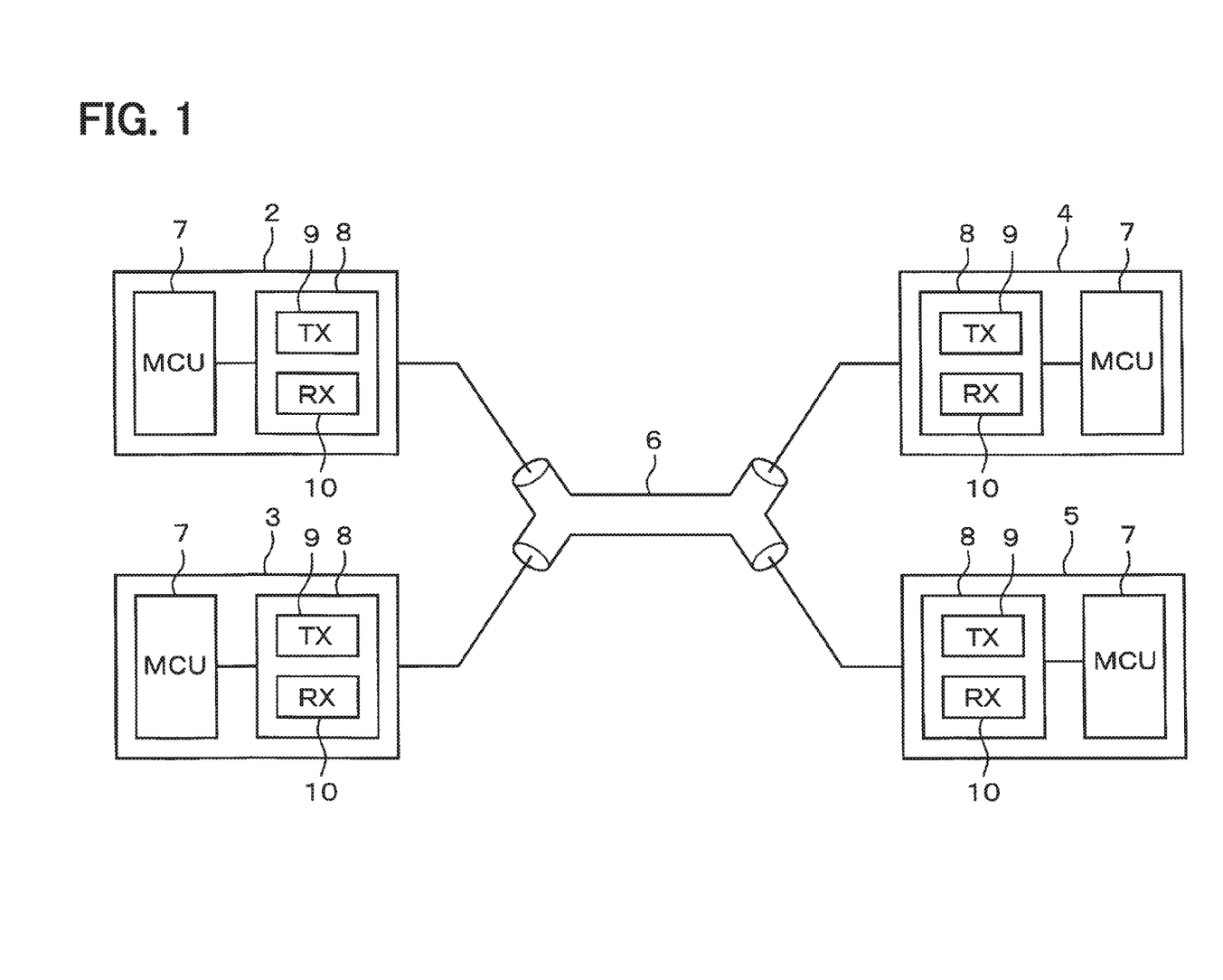
FIG. 1 is a block diagram schematically showing an example of an electrical configuration of an entire system according to a first embodiment.

FIG. 1 schematically shows an example of an electrical configuration of an entire system 1. In the system 1, for example, multiple communication nodes 2-5 are connected through a transmission line 6. The communication nodes 2-5 are communicable each other though the transmission line 6 by using a protocol in accordance with a predetermined standard. Each of the communication nodes 2-5 includes a MCU (Micro Control Unit) 7 and a transceiver 8. In side of the transceiver 8, a transmitter 9 and a receiver 10 are configured inside the transceiver 8. According to the embodiment, since a content of the receiver 10 includes a characteristic, the configuration of the receiver 10 will be explained in detail and an explanation of the content of the transmitter 9 is omitted.

Figure 2:
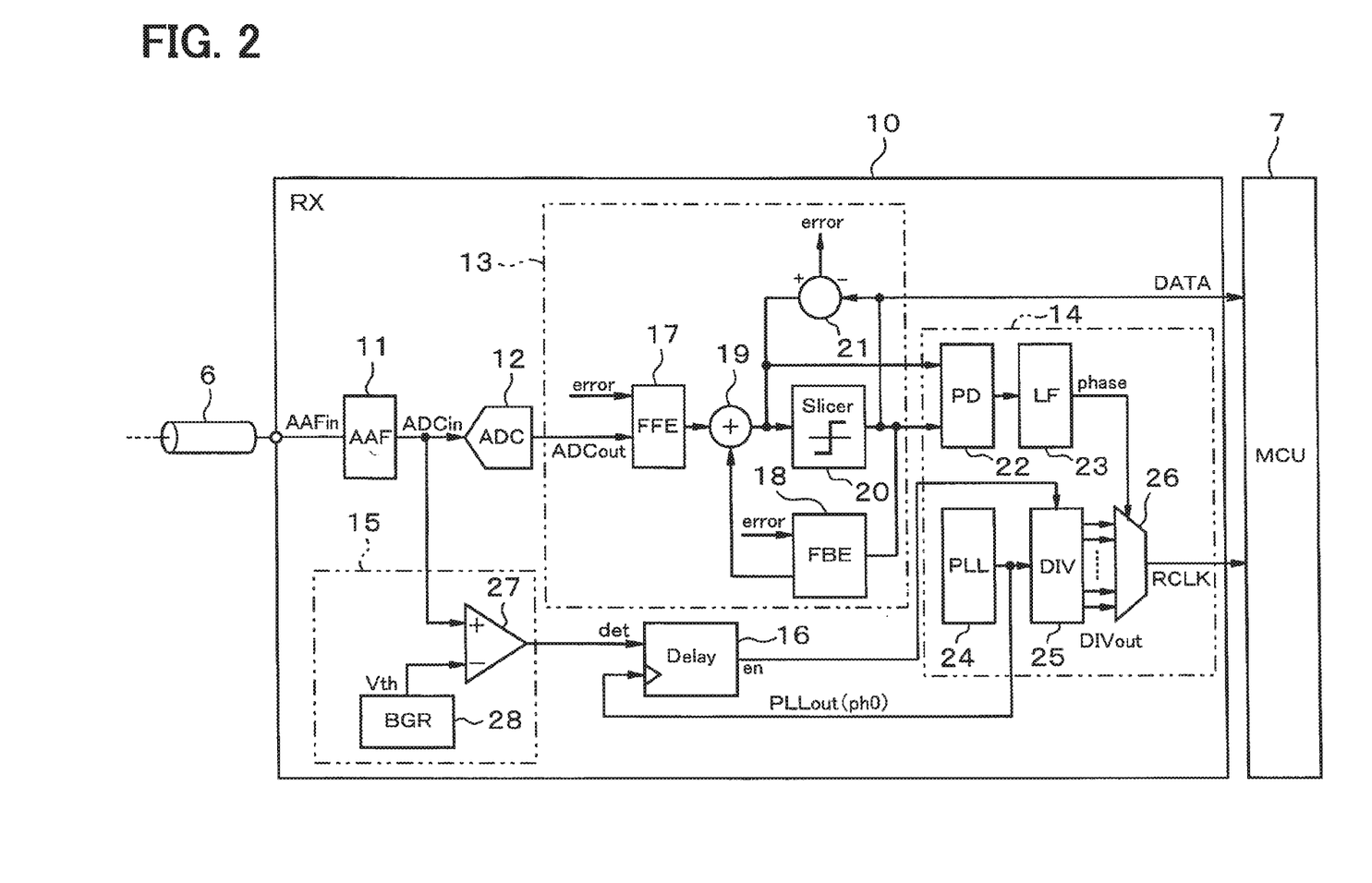
FIG. 2 is a block diagram schematically showing an electrical configuration of a receiver.

FIG. 2 shows a detailed example of the receiver 10. The receiver 10 includes an anti aliasing filter (AAF) 11, an A/D converter (analog digital converter) 12, an equalizer 13, a timing recovery part 14, a detector 15 and a delay circuit 16. The delay circuit 16 corresponds to an initial phase setting part of the preset disclosure.

The receiver 10 inputs a signal to the A/D converter 12 through the AAF 11. The AAF 11 is a filter limiting a passing band and, for example, is configured by using Butterworth filter that has flat gain characteristics in a predetermined passing band. The AAF 11 is installed to prevent an aliasing that may occur in the A/D converter 12. The A/D converter 12 performs the A/D conversion of the input signal inputted through the AAF 11. An output of the A/D converter 12 is inputted to the equalizer 13.

The equalizer 13 includes a feed forward equalizer (hereinafter, may be referred to as a FFE) 17, a feedback equalizer (hereinafter, may be referred to as a FBE) 18, an adder 19, a slicer 20 and a subtractor 21. Each of the FFE 17 and the FBE 18 are configured, for example, by using a digital filter. The FFE 17 eliminates an interference wave temporally advancing with respect to a main signal. The FBE 18 eliminates the interference wave temporally delaying from the main signal.

The adder 19 adds the output signal of the FFE 17 and the output signal of the FBE 18, and outputs to the slicer 20. The slicer 20 is a circuit converting a signal waveform to a data value. The subtractor 21 sets the signal based on a difference between the input signal of the slicer 20 and the signal of a reception data DATA as an error signal error and outputs the error signal error to the FFE 17 and the FBE 18. The feedback of the error signal error is performed to the FFE 17 and the FBE 18 so that the input and the output of the slicer 20 become identical each other. Consequently, a setting of the equalizer 13 converges so that the error signal becomes 0. When the error of the input and the output of the slicer 20 becomes less than a predetermined value, the convergence completes. Thereby, the error signal error is obtained corresponding to the difference between the input signal and the output signal of the slicer 20. By using the error signal error, in the FFE 17 and the FBE 18, a tap coefficient can converge to an optimum state. Thereby, the equalizer 13 eliminates an inter-code interference.

A following stage of the equalizer 13 is connected with the timing recovery part 14. The timing recovery part 14 generates the recovery clock RCLK by using a data output of the equalizer 13.

The timing recovery part 14 includes a phase detector (hereinafter, may be referred to as PD) 22, a loop filter (hereinafter, may be referred to as LF) 23, a PLL (Phase Locked Loop) 24, a divider 25 and a selector 26. In regard to a communication process within multiple communication nodes 2-5, when the receiver 10 inputs an input signal AAFin, the timing recovery part 14 is used so as to restore a clock from the input signal AAFin. The timing recovery part 14 inputs the reception data DATA and a signal of a common connection node between the adder 19 and slicer 20, and generates the recovery clock RCLK based on the signal.

The PD 22 receives the reception data DATA and the signal of the common connection node within the adder 19 and the slicer 20, detects the phase difference within the signals, and determines to perform either an increase process or a decrease process of the phase of the recovery clock RCLK. The output signal of the PD 22 is inputted to the LF 23. The LF 23 is a loop filter that integrates outputs of the PD 22, and is installed to stabilize a negative feedback operation of the timing recovery part 14.

Figure 3:
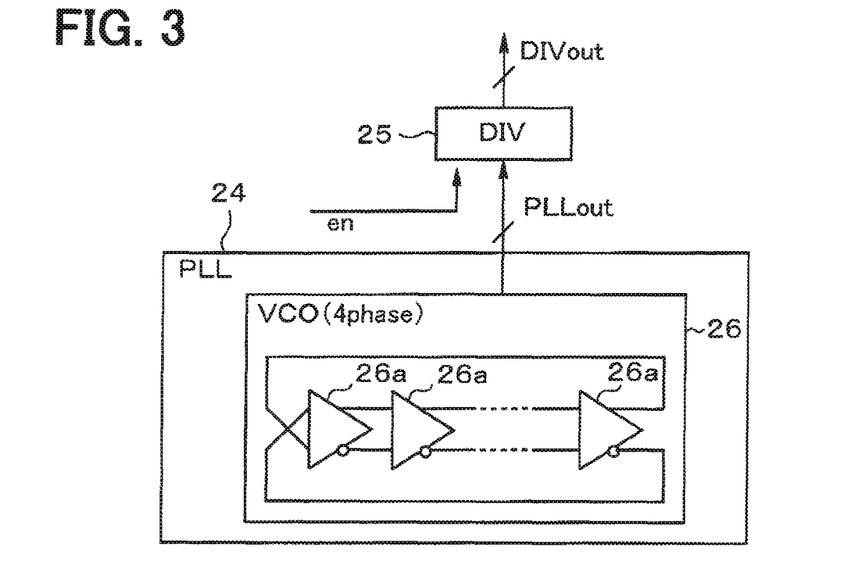
FIG. 3 is a block diagram schematically showing a configuration of a PLL.
Figure 4:
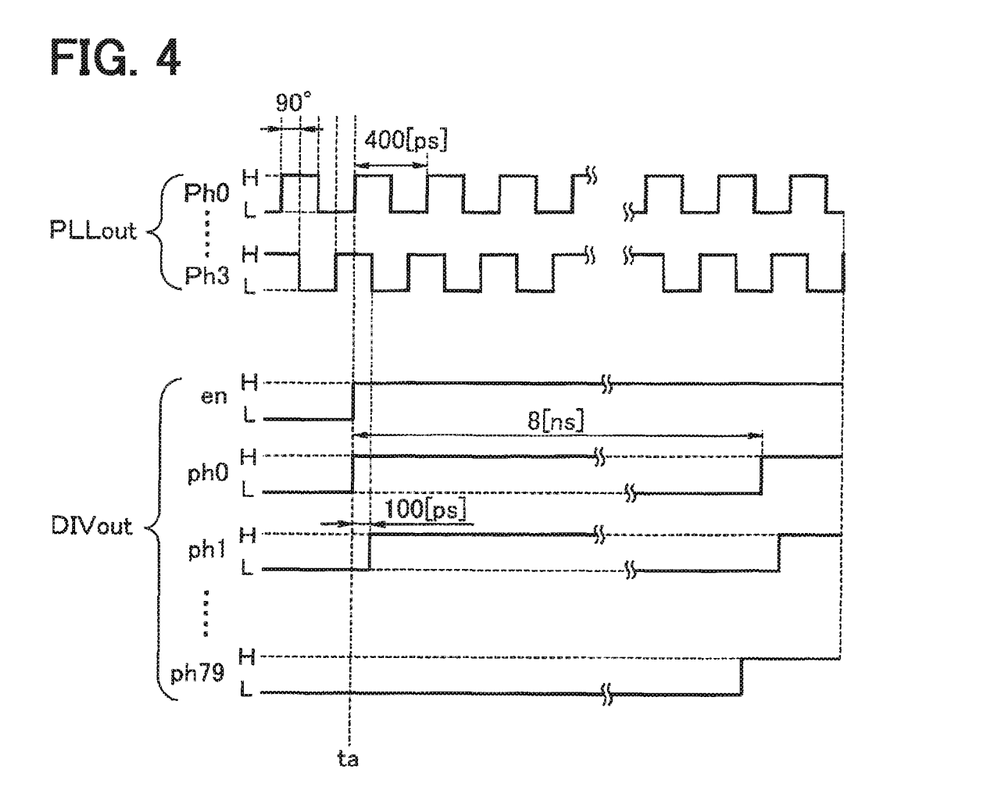
FIG. 4 is a timing chart schematically showing an output signal of the PLL and an output signal of a divider.

The PLL 24 multiplies an oscillation signal generated by using, for example, a crystal oscillator, and outputs the multiplied oscillation signal as a reference clock Ph0, Ph1, Ph2 and Ph3 to the divider 25. FIG. 3 shows the example of the configuration of the PLL 24. The PLL 24 includes a voltage controlled oscillator (referred to as a VCO) 26 inside. The VCO 26 is configured, for example, by providing an even number (for example, 4 elements) of differential type delay elements 26a in a positive feedback connection. As shown in FIG. 4, the PLL 24 outputs differential signals of multiple phases (for example, 4 phases) of a predetermined frequency (for example, 2.5 [GHz]) as the reference clocks Ph0, Ph1, Ph2 and Ph3. The phases of the reference clocks Ph0, Ph1, Ph2 and Ph3 of the PLL 24 are shifted by 90° from each other.

The divider 25 is configured so as to be possible to frequency divide the output signal of the PLL 24 (for example, 20 frequencies). For example, with change of an enable signal en of the delay circuit 16 at the start as a starting point, the divider 25 starts to perform a frequency division process of the reference clocks Ph0, Ph1, Ph2 and Ph3 of the PLL 24. The divider 25 generates the dual phase clocks ph0 to ph79 of the reference clocks Ph0, Ph1, Ph2 and Ph3 and outputs to the MCU 7 as the recovery clock RCLK.

In particular, with the timing to that the enable signal en inputted from the outside varies from "L" to "H" as the start point, the divider 25 divides the reference clocks Ph0, Ph1, Ph2 and Ph3 into 20 frequencies and starts to output the signals of 80 phases that includes ph0 to ph79 and becomes the dual phase clocks. Then divider 25 sequentially switches the signals ph1 to ph79 to an active level "H" in order every 100 [ps] and outputs.

On the other hands, the output of the LF 23 assigns the phase number of the recovery clock RCLK by the divider 25. Accordingly, the selector 26 selects the signals of an optimal phase ph0 to ph79 of the divider 25. Thereby, the selector 26 selects the output signal of the divider 25 as the recovery clock RCLK.

The detector 15 as shown in FIG. 2 includes a comparator 27 and a threshold generation part 28. The comparator 27 is arranged in parallel with the A/D converter 12 and arranged so as to perform a parallel operation at a high speed with the A/D convertor 12. The comparator 27 may be possible to be configured by a simple analog circuit in comparison with, for example, the configuration of the A/D converter 12. Therefore, it may be possible to improve the speed easily. The circuit is capable of downsizing the configuration as small as possible.

The threshold generation part 28 is a block generating a threshold voltage Vth that is stable and standard by, for example, a band gap reference (BGR) circuit. For example, the threshold voltage Vth is predetermined as a half of a maximum amplitude Vmax−Vmin (Vmin=0) of the input signal AAFin at a time that a communication starts.

The comparator 27 inputs the threshold voltage Vth generated by the threshold generation part 28 together with the input of the output signal of the AAF 11. The comparator 27 outputs a comparison result comparing the input signals as a detection signal det to the delay circuit 16. The delay circuit 16 includes a counter not shown, generates the enable signal en corresponding to the detection signal det of the detector 15 and the output signal of the PLL 24 and outputs to the divider 25 configuring the timing recovery part 14.

Then, the delay circuit 16 counts a change (for example, a rising/failing signal change) of the reference clock (for example, ph0) of a certain phase of the PLL 24 by the counter from the time that the output signal of the detector 15 becomes the active level at a beginning of starting a communication. When the delay circuit 16 counts the predetermined number (for example, 10), switches the enable signal en to the active level (for example, "H") and outputs to the divider 25. Here, the "predetermined number" may be preferable to be set in advance so that the generation timing of the recovery clock RCLK at the beginning of starting communication becomes in the vicinity of an extreme value (for example, a maximum value Vmax) of the input signal of the A/D converter 12. The details will be described later.

Hereinafter, the operation in the case that 1000 BASE-T in which data rate is regulated by 125 [Msps] is used as the transmission line 6 will be explained. The timing recovery part 14 of the embodiment is configured so as to set an initial phase of the recovery clock RCLK by operating together with the detector 15 and the delay circuit 16. Then, the detector 15 and the delay circuit 16 are operated at the time that the timing recovery part 14 sets the initial phase. Subsequently, and the MCU 7 performs the sampling process to the reception data DATA by using the recovering clock RCLK. An output frequency of the recovery clock RCLK is substantially similar to the output frequency of the A/D converter 12 and equals to a data rate and approximately 125 [MHz].

Figure 5:
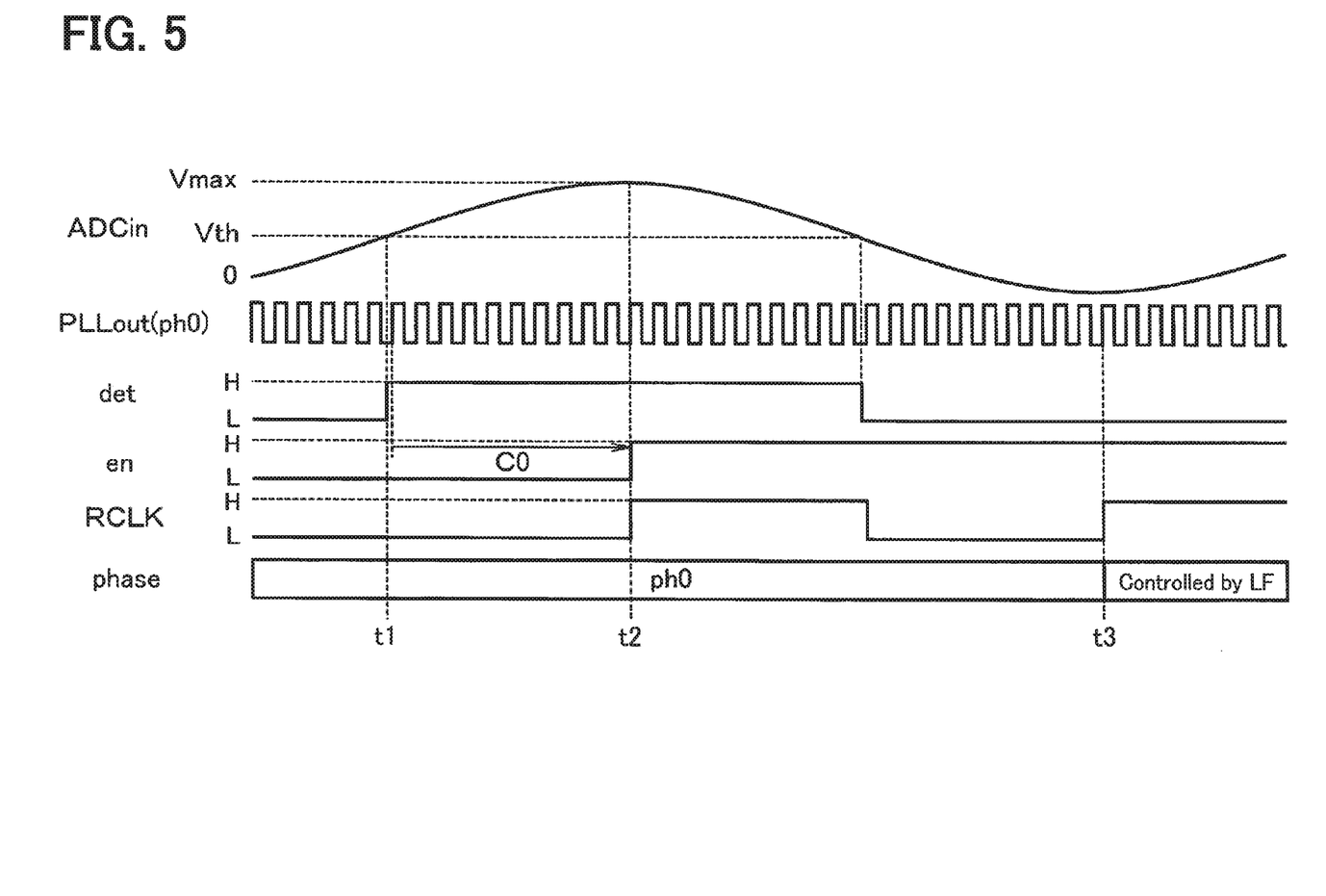
FIG. 5 is a timing chart schematically showing a signal of each node.

FIG. 5 schematically shows a signal waveform of a circuit node inside the receiver 10. According to the embodiment, at the time that the communication nodes 2-5 start, the operation that the input signal AAFin of the receiver 10 varies from the no-signal state for the first time (in the other words, the operation at the time that the input signal AAFin starts from the no-signal state and varies) will be explained in details.

The communication nodes 2-5 start, and each of the receivers 10 start and the input signal AAFin is inputted to the receiver 10. The AAF 11 performs the filter process to the input signal AAFin, which eliminates an unnecessary higher harmonic component. The AAF 11 limits a band of a input signal ADCin, and the signal waveform of the input signal ADCin becomes, for example, a frequency corresponding to the data rate (for example, 125 [MHz]). At a timing t1 of FIG. 5, when an output voltage of the AAF 11 becomes greater than the threshold Vth, the comparator 27 switches the detection signal det from a non-active level "L" to the active level "H".

The delay circuit 16 counts the change of the signal ph0 of the PLL 24 from the timing #1 that the detection signal det from the comparator 27 becomes the active level "H". As shown in timing t2 of FIG. 5, when the delay circuit 16 counts the predetermined number C0 (for example, 10), switches the enable signal en to the active level "H".

As shown at and after the timing t2 of FIG. 5, after the delay circuit 16 detects that the enable signal en becomes the active level once latches the active level. In the case that the enable signal en shifts to the active level once, even when the detection signal det of the detector 15 varies to the non-active level "L", the enable signal en of the detector 15 does not change. As shown in FIG. 4, when the divider 25 detects that the enable signal en moves to the active level, starts to output the initial signal ph0 of the clock divided in 20 frequencies. At the beginning of starting the communication, the selector 26 selects the signal ph0. As shown in the timing of FIG. 5 from t2 to t3, the signal ph0 is selected as the recovery clock RCLK and outputted.

The initial phase of the recovery clock RCLK from the signal ph0 generally becomes in the vicinity of the maximum value Vmax of the input signal ADCin. The reason is that the predetermined number C0 of the counter in the delay circuit 16 is adjusted in advance. Thereby, at the timing when the input signal ADCin becomes in the vicinity of the maximum value Vmax, it may be possible to synchronize a signal change of the recovery clock RCLK.

As shown at and after the timing t3 of FIG. 5, the timing recovery part 14 performs a negative feedback control by the PD 22 and the LF 23, and the phase of the recovery clock RCLK is set. Therefore, it may be possible to adjust the phase of the recovery clock RCLK to an optimal position from the beginning of starting the communication.

Figure 6:
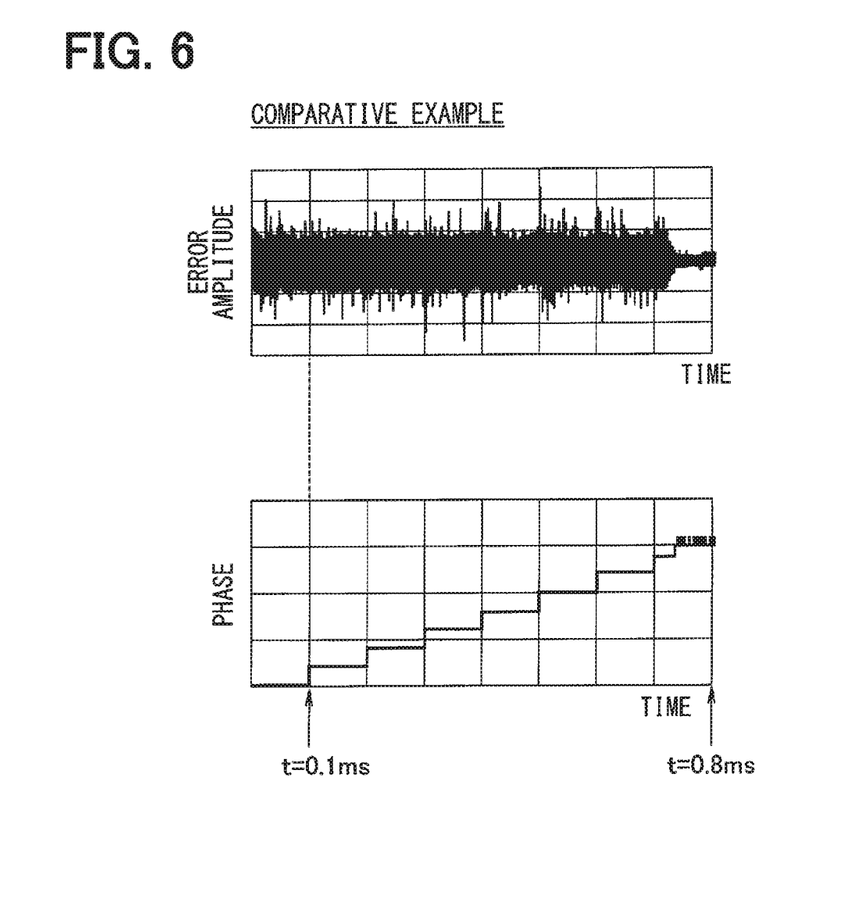
FIG. 6 is a diagram showing a simulation result when a technology of a comparative example is adapted.

A simulation result will be explained. FIG. 6 is the wave form showing the simulation result of a magnitude of the error signal error according to a time lapse from the start and a magnitude of the phase according to the time lapse when the technology of a comparative example (for example, Patent Literature 1) is used. As shown in FIG. 6, until the equalizer convergence is completed, the phase of the recovery clock RCLK slowly and linearly increases. According to the example, approximately t=0.8 [ms] elapses until the equalizer convergence is completed. That is, when the technology of the comparative example is used, by increasing the phase of the recovery clock RCLK slowly and linearly, an edge of the recovery clock RCLK is gradually shifted to the input signal ADCin, and sequential verification is performed. Hence, it takes longtime until the initial phase of the recovery clock RCLK is set.

Figure 7:
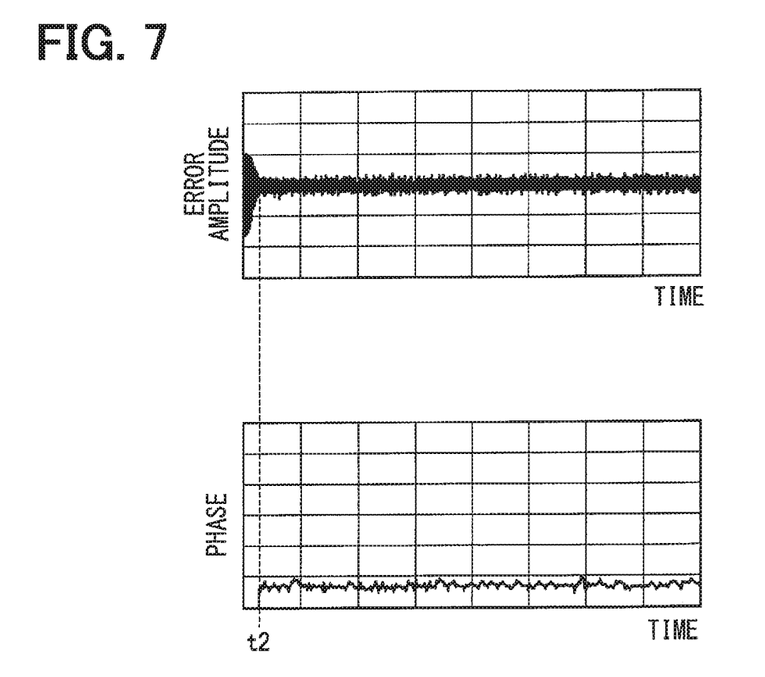
FIG. 7 is a diagram showing a simulation result when a technology of the first embodiment is adapted.

FIG. 7 shows the waveform corresponding to FIG. 6 when the embodiment is adapted. A timescale of FIG. 6 and FIG. 7 are same. As shown in FIG. 7, at a timing t2 that t2<0.1 ms is satisfied, it may be possible to converge so that the error signal error outstandingly closes to 0. Such as the technology of the comparative method, it becomes unnecessary to vary the phase of the recovery clock RCLK slowly and linearly.

By using the technology of the embodiment, it may be possible to quickly set the phase of the recovery clock RCLK to the phase in the vicinity of the maximum value Vmax of the input signal ADCin. It may be possible to decrease a waiting time that is necessary to the communication.

An inventor of present disclosure has found as follow. As shown in the embodiment, when the equalizer 13 is configured by using the FFE 17 and the FBE 18, a convergence process of the FFE 17 and the FBE 18 at the start are sometimes different. For example, in the convergence process, the interference wave by the FBE 18 is sufficiently eliminated. However, when the interference wave by the FFE 17 is not sufficiently eliminated, the interference wave that temporally advances with respect to the main signal remains. Nevertheless, the wave form includes that a preceding interference with respect to the main signal decreases is sometimes formed.

In this case, by using Mueller-Muller Timing Recovery technology, though an algorithm that estimates a sampling position so as to satisfy the state that amplitudes of the interference wave that temporally precedes or succeeds a main signal is equaled is adapted, the error signal varies. Each of the convergence operations of the FFE 17 and the FBE 18 may receive a negative effect.

According to the embodiment, the detector 15 detects the timing t1 that the input signal varies from the no-signal state at the start and reaches the threshold Vth. The delay circuit 16 sets the timing elapsing the predetermined time after the timing of the detection to the initial phase of the recovery clock RCLK from the timing recovery part 14. Therefore, even when the input signal varies from the no-signal state at the start, it is unnecessary to slowly vary the phase of the recovery clock RCLK such as the technology of the comparative example. It may be possible to quickly and properly set the initial phase of the recovery clock RCLK.

The detector 15 is configured by using the comparator 27 arranged in parallel with the A/D converter 12. The comparator 27 detects the timing t2 that the threshold voltage Vth is reached, and sets to the output signal. The delay circuit 16 delays the output signal of the comparator 27 by the predetermined time and outputs to the timing recovery part 14, and sets as the initial phase of the recovery clock RCLK. It may be possible to set the initial phase of the recovery clock RCLK by a simple circuit by using the comparator 27 and the delay circuit 16.

The predetermined time is set in advance so that the input signal of the A/D converter 12 starts to change from the no-signal state and reaches the vicinity of the maximum value Vmax as the vicinity of the extreme value. It may be possible to set the timing that the input signal of the A/D converter 12 becomes the vicinity of the maximum value Vmax to the initial phase, and to set the sampling timing of an initial stage of the communication.

When the timing recovery part 14 generates the recovery clock RCLK, the PLL 24 outputs the reference clocks Ph0-Ph3. Then, with the initial phase of the recovery clock RCLK set by the delay circuit 16 as a starting point, the divider 25 starts to divide the reference clocks Ph0-Ph3, and generates the dual phase clocks ph0-ph79. Corresponding to the dual phase clocks ph0-ph79, the recovery clock RCLK is generated. Thereby, the initial phase of the recovery clock RCLK is properly set and it may be possible to continue to output the recovery clock RCLK.

Second Embodiment

Figure 8:
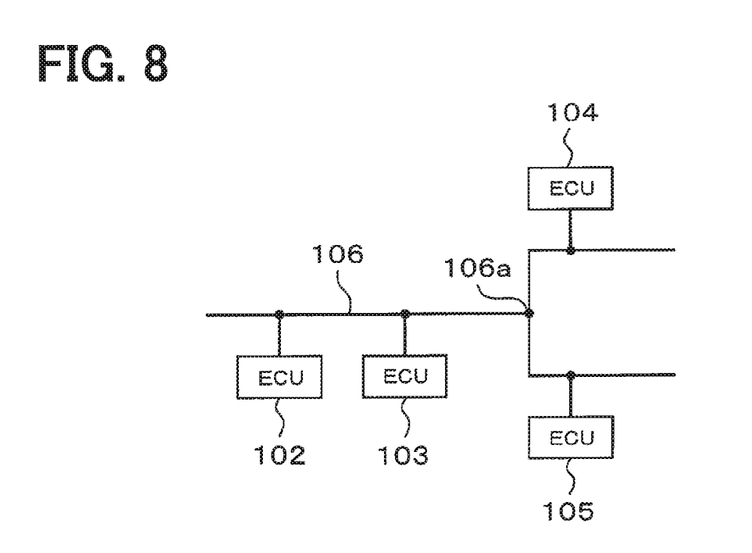
FIG. 8 is a block diagram schematically showing an example of an electrical configuration of an inside of a vehicle according to a second embodiment.

FIG. 8 to FIG. 11 show a second embodiment. The embodiment shows an embodiment that the transmission line 6 is adapted to a bus 106 of an on-vehicle LAN (Local Area Network) and ECUs 102-103, which are on-board apparatus, are connected to the bus 106. As shown in FIG. 8, the bus 106 includes a branch point 106*a* or the like, and is laid in a vehicle. The bus 106 is connected with multiple ECUs 102-105. Thereby, multiple ECUs 102-105 are communicable based on a controller area network (CAN) standard. The embodiment shows an application when the communication is performed by using CAN-FD standard that is extended from a CAN communication. CAN-FD standard is considered as a communication standard corresponding to a flexible data rate.

Figure 9:
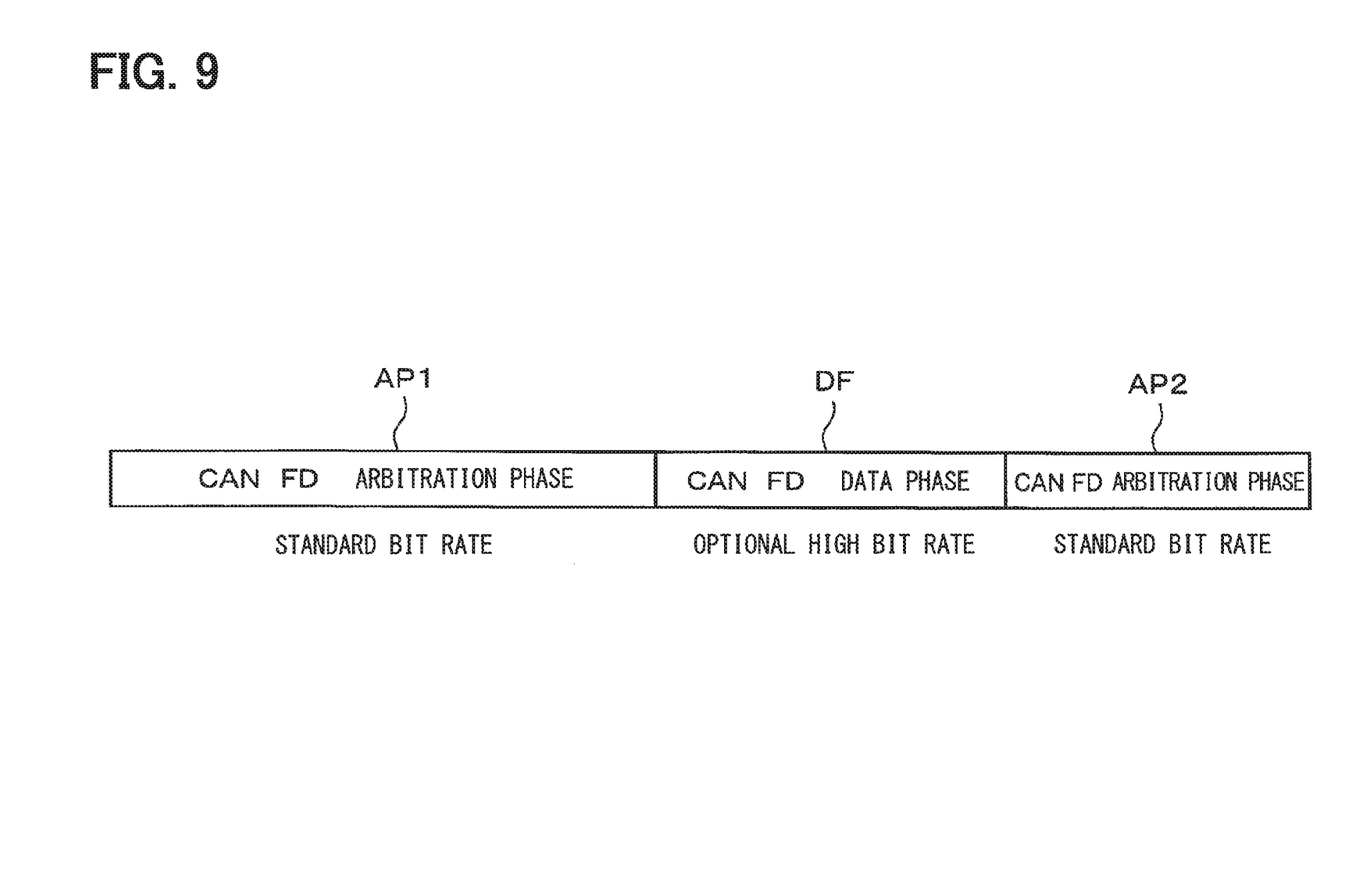
FIG. 9 is a diagram showing an outline of a flame format of CAN-FD.
Figure 10A:
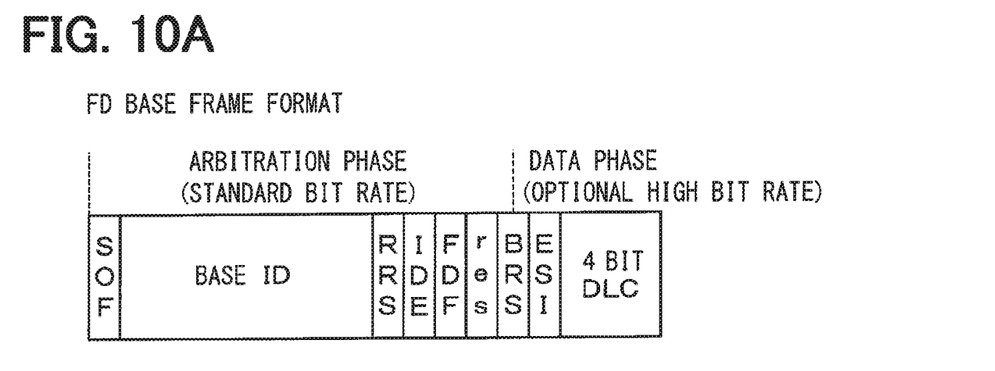
FIG. 10A is a diagram showing a detail of a basic format of a first half related to a flame of CAN-FD.
Figure 10B:
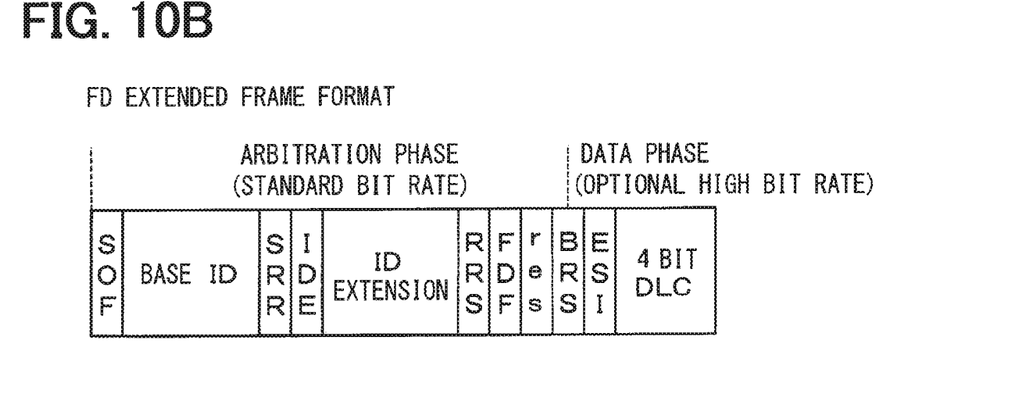
FIG. 10B is a diagram showing a detail of an extended format of a first half related to a flame of CAN-FD.

FIG. 9 shows an outline of an entire flame of the CAN-FD standard. FIG. 10A and FIG. 10B show a detail of a basic format and an extended format of the first half of a flame.

CAN-FD standard is a communication standard mixing phases of two kinds of the data rates. As shown in FIG. 9, it is regulated that, in arbitration phases AP1, AP2 respectively corresponding to a first part and a second part, a communication speed is set to 1 [Mbps] at most that is standard bit rate. It is regulated that, in a data phase DP between the arbitration phases, it is capable of communicating at the communication speed greater than 2 [Mbps] or more that is high bit rate.

It is regulated that, in the case that a FDF (FD format indicator) value of the arbitration phase AP1 as shown in FIG. 10A and FIG. 10B is recessive, the data phase DF in the corresponding flame becomes the high bit rate, and in the case of being dominant, the communication speed of the data phase in the corresponding flame becomes standard. An identification code base ID in FIG. 10A and FIG. 10B shows the identification code used to identify the transmitting node (for example, a subject ECU, another ECU).

Although multiple ECUs 102-105 transmit the signal to the bus 106, the signal extremely deteriorates by reflecting at the branch point 106a. Even when a conventional technology is adapted, it is difficult to improve speed of the communication in the data phase DF. By contrast, it is achieved that when the configuration according to the second embodiment based on the technology as shown in the first embodiment is adapted, the communication speed in the data phase DF can be improved. Hereinafter, it will be explained.

CAN-FD is a standard with CAN extended and adopts a communication system using carrier Sense Multiple Access with Collision Avoidance (CDMA/CA). In a vehicle, multiple ECUs 102-105 are connected by the bus 106. However, it is regulated that, when multiple ECUs 102-105 simultaneously transmit the data to the bus 106, arbitration is performed in the arbitration phase AP1 and the communication having high priority is performed by using the bus 106. In the arbitration phase AP1, data collision may occur. Therefore, it may be preferable that the technology as shown in the first embodiment is adopted in the data phase DF without using the technology as shown in the first embodiment in the arbitration phase AP1. Since the arbitration phases AP1, AP2 are regulated so as to use a low speed communication, a necessary of using the technology explained in the first embodiment is not high. For the reason, the data reception may be performed by using a classic CAN receiver.

Figure 11:
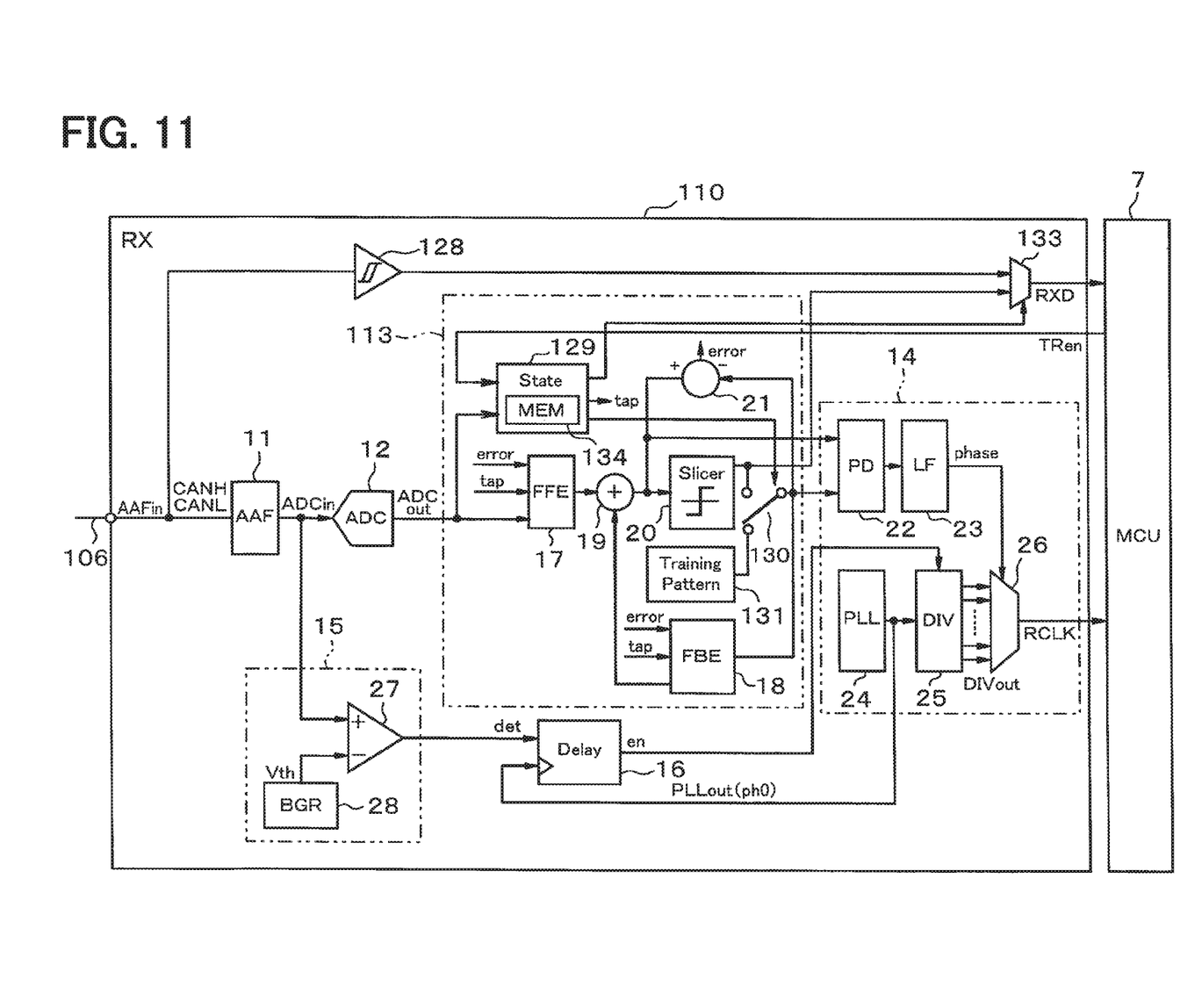
FIG. 11 is a block diagram showing an example of an electrical configuration of a receiver.

FIG. 11 shows the example of the configuration to implement the contents. A receiver z shown in FIG. 11 is different from the receiver 10 shown in the first embodiment in a point that a classic CAN receiver 128 is included, the data reception is performed by using the classic CAN receiver 128 in the arbitration phases AP1 and AP2 of standard bit rate, and the data reception is performed by using the technology of the first embodiment in the data phase DF of high bit rate. A receiver 110 includes a state control circuit 129. The state control circuit 129 adjusts tap coefficients of the FFE 17 and the FBE 18, which has become difference.

The receiver 110 includes the classic CAN receiver 128 and the selector 133 together with the AAF 11, the A/D converter 12, an equalizer 113 instead of the equalizer 13, the timing recovery part 14, the detector 15 and the delay circuit 16.

The equalizer 113 includes the state control circuit 129, a switch 130 and a training pattern generation circuit 131. The state control circuit 129 includes an element that functions as a switching part, a selection control part and a data reception control part. The state control circuit 129 corresponds to the switching part, the selection control part and the data reception control part of the present disclosure. The switch 130 is three-terminal switch including a first and a second fixing terminal and a movable terminal. Together with the first fixing terminal connected to the slicer 20, the second fixing terminal is connected to the training pattern generation circuit 131. Together with the movable terminal connected to a negative input of the subtractor 21, the movable terminal is connected to a feedback input of the FBE 18 and is connected to the input of the PD 22. The switch 130 is arranged so that the switching control can be performed by the state control circuit 129.

The MCU 7 selects either a normal mode or a training mode, and operates based on a selected mode. The MCU 7 transmits a training enable signal TRen to the transceiver, which transmits a mode state to the state control circuit 129 of the receiver 110.

The state control circuit 129 is the block controlling the state of each block and includes a storage part 134. When the state control circuit 129 receives an enable input of the training enable signal TRen from the MCU 7, the state control circuit 129 moves to the training mode. When the state control circuit 129 receives an unenable input, the state control circuit 129 moves to the normal mode. In the training mode, the state control circuit 129 performs the switching control of the switch 130 so that the training pattern generation circuit 131, the FBE 18, the subtractor 21 and the PD 22 are connected. In the normal mode, the state control circuit performs the switching control of the switch 130 so that the slicer 20, the FBE 18, the subtractor 21 and the PD 22 are connected.

The training pattern generation circuit 131 is a block used in the training mode. For example, while the training pattern generation circuit 131 generates the training pattern of a binary signal from a pseudo random binary sequence (PRBS) and sets the identification code base ID corresponding to the identification number of the own ECU to the arbitration phase AP1, the training pattern generation circuit 131 sets the training pattern to the data phase OF and outputs the signal.

In the training mode, the state control circuit 129 causes the FBE 18 to receive the output signal of the training pattern generation circuit 131. In the normal mode, corresponding to the output signal of the A/D converter 12, the state control circuit 129 determines which flame the contents of the data are in. Corresponding to a determination result, the state control circuit 129 outputs a selected signal to the selector 133. Corresponding to the selected signal, the selector 133 selects the data of the classic CAN receiver 128 or the receiver 110 and outputs the data to the MCU 7. When the switch 130 is switched to a side of the slicer 20, the receiver 110 preforms the data reception in the normal mode. Then, the configuration of the receiver 110 equals to the configuration of the receiver 10 of the first embodiment.

According to the configuration, the operation in the training mode will be explained in detail. The training mode is a mode in advance converging tap coefficients of the FFE 17 and the FBE 18 in preparation for the case that the communication at the high bit rate is performed. In the training mode, together with setting the identification code base ID to the arbitration phase AP1, the training pattern generation circuit 131 sets the training pattern to the data phase DF. The training pattern generation circuit 131 outputs the flame to the FBE 18 and converges the tap coefficient. Then, the state control circuit 129 generates the tap coefficients of the FFE 17 and the FBE 18 so that the error signal error of the subtractor 21 is converged to a minimum value. Thereby, the FFE 17 and the FBE 18 may be possible to adjust an equalize function corresponding to the tap coefficient.

In the training mode, in the case that the convergence process of the tap coefficient is not performed in advance, even when the receiver 110 starts the convergence operation of the tap coefficient after the signal of the data phase DF is received, the convergence operation will not be made in time.

In the training mode, the state control circuit 129 holds an optimal tap coefficient in the storage part 134 in advance corresponding to the identification code base ID and, in the normal mode, writes the tap coefficient into the FFE 17 and the FBE 18 corresponding to the identification code base ID so that the receiver 110 properly receives the data immediately after the start of the data phase DF.

Figure 12:
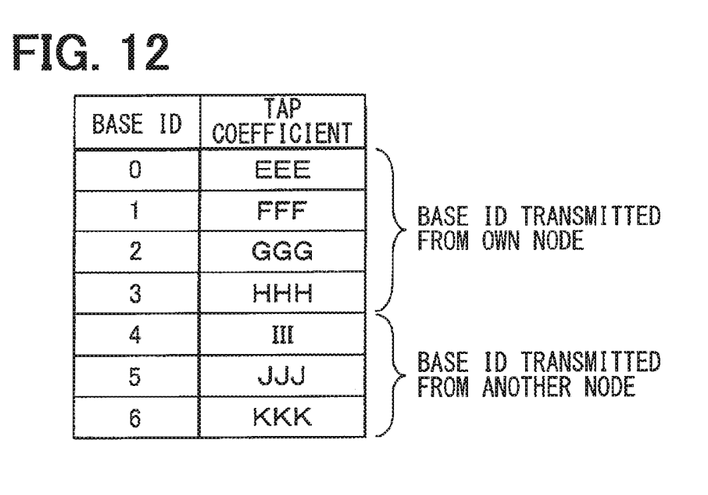
FIG. 12 is a diagram schematically showing an example of a holding content of a storage part.

After moving to the training mode, the state control circuit 129 switches the switch 130 and performs training by using the training pattern generation circuit 131. After the training process completes, the state control circuit 129 holds the tap coefficient in the storage part 134. The content stored by the storage part 134 is shown in FIG. 12. In the training mode, without using the output of the slicer 20 but using the training pattern, the tap coefficient of the FFE 17 and the FBE 18 are converged. Thereby, it may be possible to converge the tap coefficient of the FFE 17 and the FBE 18 of the equalizer 113 promptly. It may be possible to converge the tap coefficient in the data flame of 64 bites during the training mode.

The embodiment shows the embodiment configuring the storage part 134 in the state control circuit 129. However, the storage part 134 may be arranged inside, outside or anywhere of the receiver 110. As shown in FIG. 12, the tap coefficient is stored corresponding to base ID. The tap coefficient is stored corresponding to the communication from the outside. Thereby, the state control circuit 129 may become possible to use the tap coefficient in the data phase DF by reading the tap coefficient corresponding to the base ID from the storage part 134 in the normal mode.

Subsequently, the state control circuit 129 is switched to the normal mode corresponding to a command from the MCU 7. The state control circuit 129 inputs the output signal of the A/D converter 12 and determines to receive any of the data in the arbitration phases AP1, AP2 and the data phase DF, and determines the state.

When the state control circuit 129 determines a FDF value in CAN-FD format as dominant by using the output signal ADCout of the A/D converter 12, at a subsequent timing in the middle of a receiving subsequent BRS, switches a selector 133 to a side of the classic CAN receiver 128. Thereby, when the FDF value is dominant, the classic CAN receiver 128 may be possible to perform the data reception in the middle of the data phase DF in the standard bit rate.

Figure 13:
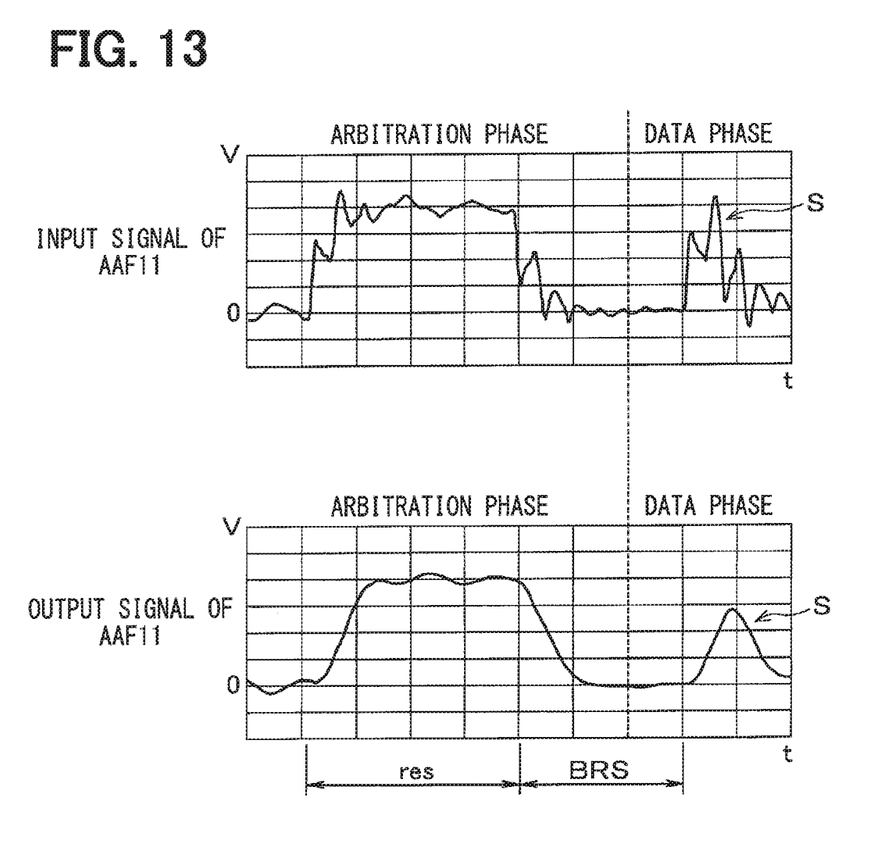
FIG. 13 is a timing chart schematically showing an input signal and an output signal of AAF in a period near a boundary between an arbitration phase and a data phase.

By contrast, when the state control circuit 129 determines a FDF value as recessive by using the output signal ADCout of the A/D converter 12, at the subsequent timing in the middle of a receiving subsequent BRS, switches the selector 133 to the side of the equalizer 113. Thereby, when the FDF is recessive, the receiver 110 may be possible to perform the data reception in the data phase DF in the high bit rate. FIG. 13 schematically shows the input signal and an output signal of the AAF 11 in the period of the vicinity of the border between the arbitration phase AP1 and the data phase DF. The output signal of the AAF 11 corresponds to the input signal of the A/D converter 12.

As shown in FIG. 13, a signal S of an initial bit of the data phase DF after the arbitration phase AP1 becomes a waveform that is greatly distorted. The input signal of the AAF 11 is buried in a noise. Therefore, even when the input signal of the AAF 11 is inputted to the equalizer 113, it is impossible to correctly perform a phase estimation. However, according to the embodiment, the AAF 11 causes to input the signal after processing to the equalizer 113 and the detector 15. Since the signal is formed as the waveform that the phase estimation is easily performed by eliminating a high frequency noise, the timing recovery part 14 may become possible to certainly estimate the initial phase.

As shown in FIG. 13, after the state control circuit 129 determines to be in the period of BRS, operates so that the process to the divider 25 by the enable signal en of the detector 15 is operated effectively. The detector 15 detects the rising of the bit signal S from the threshold voltage Vth and the delay circuit 16 may be possible to set the vicinity of the maximum value to the initial phase of the recovery clock RCLK. Thereby, it may be possible to certainly set the initial phase of the recovery clock RCLK in the data phase DF of the high bit rate.

As explained above, according to the embodiment, a similar effect as the embodiment previously described is provided.

In the storage part 134, the identification code base ID and the tap coefficient are corresponded and held in advance. The state control circuit 129 switches the tap coefficient by corresponding to the identification code held in the storage part 134 and performs the communication based on CAN standard. Hence, it may be possible to converge the equalizer 113 by using the tap coefficient corresponding to the identification code base ID.

In the training mode, the receiver 110 is configured to set the tap coefficient of the equalizer 113 and stores in the storage part 134 in advance. In the normal mode, the receiver 110 is configured to set the tap coefficient stored in the storage part 134 to the equalizer 113 and to perform the data reception. Therefore, it may be possible to quickly set the optimal tap coefficient in the normal mode. Thereby, for example, even when the communication is performed in the high bit rate in the data phase DF, it may be possible to set the tap coefficient of the storage part 134 quickly and correspond to the communication of the high bit rate immediately.

The receiver 110 switches output data of the classic CAN receiver 128 and the equalizer 113 by using the selector 133, and sets as a reception data RXD. The receiver 10 may be possible to use by switching a reception system when the data of the standard bit rate and the data of the high bit rate are received.

In the above, the embodiment, the configuration, an aspect relate to the present disclosure are exemplified. However, the present disclosure is not limited to every embodiment, every configuration and every aspect relate to the present disclosure are exemplified. For example, the field of the embodiment, the configuration, the aspect relate to the present disclosure includes the embodiment, the configuration, the aspect obtained by accordingly combining each technical part disclosed in different embodiment, configuration and aspect.

The invention claimed is:

1. A receiver comprising:
an A/D converter that performs an analog digital conversion to an input signal;
an equalizer that equalizes an output of the A/D converter, eliminates an inter-code interference and obtains a data output;
a timing recovery part that generates a recovery clock by using the data output of the equalizer;
a detector that detects a timing when the input signal varies from a non-signal state and has reached a predetermined threshold; and
an initial phase setting part that sets as an initial phase of the recovery clock from the timing recovery part, a timing when a predetermined time has elapsed after the timing detected by the detector, wherein:

the timing recovery part includes a phase lock loop that outputs a reference clock and a divider that divides the reference clock of the phase lock loop; and when the recovery clock is generated, the phase lock loop outputs the reference clock, with the initial phase of the recovery clock set by the initial phase setting part as a start, the divider starts to divide the frequency of the reference clock, generates dual-phase clocks and generates the recovery clock corresponding to the dual-phase clocks, and wherein the detector includes a comparator arranged in parallel with the A/D converter;

the detector detects the timing that has reached the threshold by the comparator and obtains a output signal; and the initial phase setting part includes a delay circuit that delays outputs the output signal to the timing recovery part with a delay of the output signal of the comparator for a predetermined time, and obtains the initial phase of the recovery clock.

2. The receiver according to claim 1, wherein:
the predetermined time is set in advance so that the input signal of the A/D converter starts to vary from the no-signal state to a vicinity of a maximum value.

3. The receiver according to claim 1, wherein:
the receiver is provided in an on-board apparatus.

* * * * *